June 4, 1929.   W. T. BONNER   1,716,026
BRAKE
Filed Aug. 26, 1926
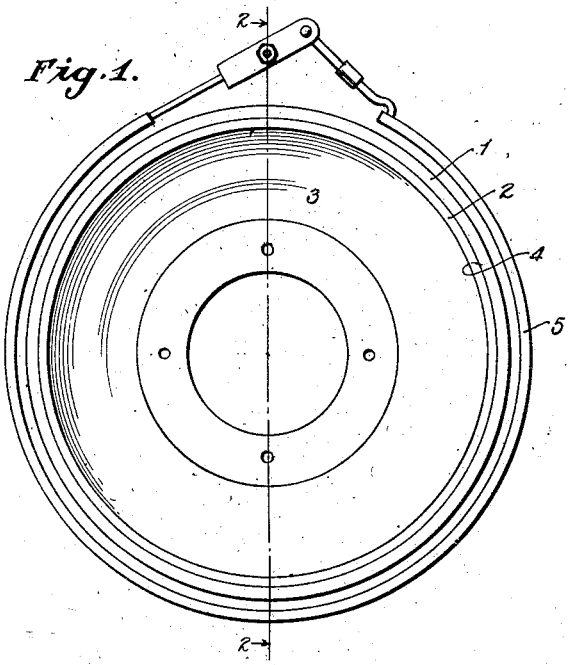
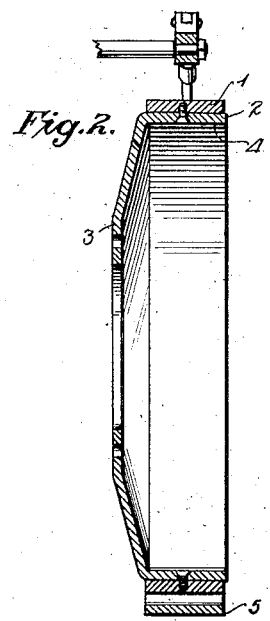
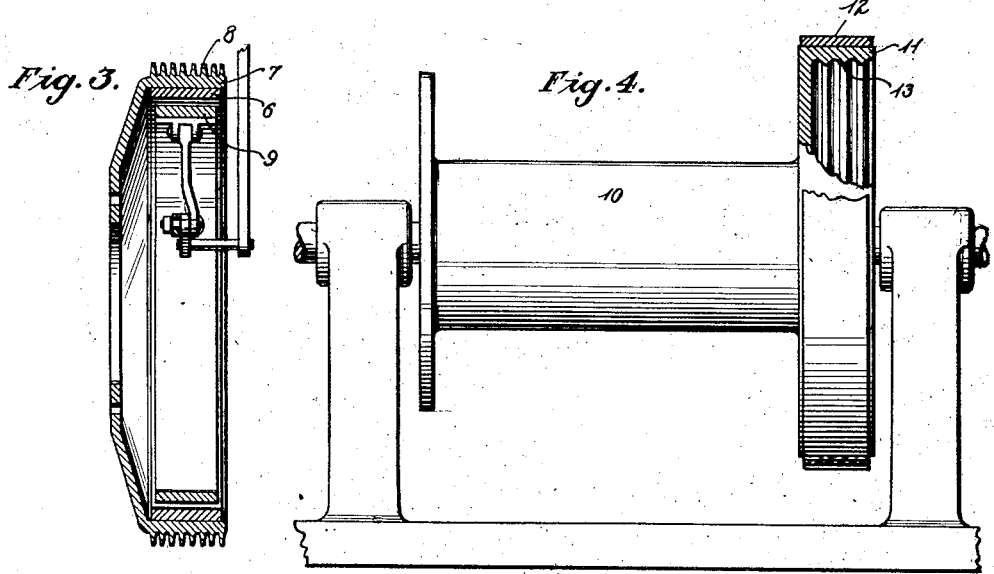
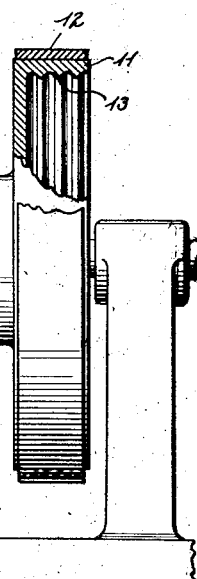
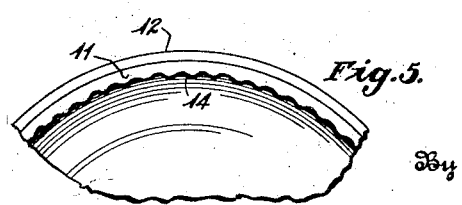
Inventor
W. T. Bonner Patented June 4, 1929.

1,716,026

UNITED STATES PATENT OFFICE.

WILLIAM T. BONNER, OF TRENTON, NEW JERSEY, ASSIGNOR TO A. F. COLGREN, OF CHICAGO, ILLINOIS.

BRAKE.

Application filed August 26, 1926. Serial No. 131,748.

This invention relates to brakes; and it comprises a brake having an iron or steel annulus or drum as the braked member and an engaging braking member located either inside or outside the drum, the engaged face of the drum carrying a strip of mineral matter of low heat conductivity, usually asbestos, said strip acting both as a friction member and as a heat insulating layer, and the non-engaged face being exposed for free heat radiation, said exposed face being often provided with means for facilitating radiation; all as more fully hereinafter set forth and as claimed.

For the sake of strength, brakes are ordinarily made of iron or steel which are metals of relatively low heat conductivity, and disposition of the great amount of heat developed in braking is sometimes a serious problem. In an ordinary type of brake, strengthened asbestos is used as a friction lining. Asbestos is of mineral nature and does not burn or spark. Sometimes it is reinforced with wire; sometimes a binder, such as rubber, having good tensile strength is employed. Asbestos, being a material of low heat conductivity, the heat developed on the face of the lining strip, although it does pass into its body, does not pass rapidly. Its heat conductivity however increases as the temperature rises.

A common type of brake uses a drum as the braked member, braking being effected by an outside flexible strap and an inside expansible member, each carrying an asbestos friction facing. The difficulty with this structure is that the drum being, so to speak, double heated, in any heavy duty braking may become dangerously hot; and especially at the surface. A better arrangement is that disclosed and claimed in my prior Patent No. 1,426,543, August 22, 1922, where the asbestos facing is transferred from the braking members to the drum. Here it acts as a sort of heat insulation for the heavy metal of the drum. The braking members are commonly of comparatively light metal construction and dissipate heat more readily than does the drum.

In certain relations, however, and especially in heavy duty work, as in truck brakes, oil well brakes, and the like, where the amount of energy to be dissipated is great or braking is continued over a relatively long time, it is found in practice that the drum heats up. As stated, heat goes through the asbestos to some extent and in this structure it accumulates in the drum element faster than it can be dissipated therefrom, so that the drum temperature builds up.

In the present invention, I have provided an improvement on the brake of my prior patent. In the said patent both faces of the drum, the inner and the outer, are covered by the asbestos composition. I find that for some work, it is better to abandon using both faces for braking and leave one face clear or naked for heat radiation. By so doing, the retained asbestos facing on one side acts to prevent communication of much of the friction heat to the drum, while the free face of the drum radiates the heat that does penetrate through the asbestos layer. In other words, the asbestos facing acts to prevent most of the heat gaining access to the metal of the drum, while such heat as does penetrate the asbestos and reach the drum is given an opportunity to escape. Heat radiation may be facilitated by finning, corrugating, or otherwise specially shaping the exposed radiating face. It is best to have it of black iron and not polished. Rough surfaces dissipate heat more rapidly than smooth. The same considerations apply to the braking member. Black heat-radiating paints or coatings, such as graphite, are sometimes useful. Sand blasting to give a roughened surface is also often useful.

The asbestos friction member may be of any of the usual types employed in the braking art; such as asbestos spun over wire and woven into fabric; laminated fabric containing wire fabric, plastic compositions made with asbestos and such binders as rubber, linseed oil, etc. Using asbestos in the present invention as a layer on the braked element, not so much tensile strength is required as where it occurs as a layer on the braking member. The strains are mostly compression strains and no flexibility is necessary. The asbestos friction layer under the present invention may be used either as a lining on the interior face of a drum, the exterior face of the drum then being used as a radiating surface; or it may occur as a facing on the outer surface of the drum, the interior then becoming the radiating element. Where it is used as an interior facing, the usual types of expansible braking members may be employed; where it is an outer facing, the usual strap types of braking elements may be used.

In the accompanying illustration I have shown, more or less diagrammatically, certain embodiments of the present invention. In this showing, Figure 1 is a transverse sectional view through a brake embodying my invention and employing an external contracting brake shoe;

Figure 2 is a partial sectional view taken along the line 2—2 of Figure 1;

Figure 3 is a similar view of a modified form of my invention adapted for use with an internal expanding brake shoe;

Figure 4 is a fragmentary view, partly in section, of a brake comprising the present invention applied to the cable drum of a hoist, the interior face of the brake flange being formed with annular corrugations to increase the area of its surface; and Figure 5 is a fragnmentary detail view of a brake drum, the interior face of which is transversely corrugated to increase its surface area.

Referring to the drawings:

In Fig. 1, friction facing 1, of strengthened asbestos or similar heat resisting material or compound of low heat conductivity, is permanently attached to the outer face of a flange 2 which is an integral part of a brake drum 3, the opposite inner face 4 of the flange being naked and exposed for the purpose of dissipating heat which is generated by application of the brake. The exposed face of the flange may be bare and, it is advantageously of black iron or steel for the purpose of assisting radiation and rapid dissipation of heat, and I have sometimes found it advantageous to roughen this face or coat it with graphite or a dark colored paint. Both expedients may be used. A dark rough surface radiates heat more rapidly than one which is polished or of a light color. Surrounding the brake drum, and spaced from the friction facing which is mounted on it, is a brake band 5 which, when it is contracted, frictionally engages the facing of the drum and effectively stops rotation.

A modified form of invention is shown in Fig. 3 wherein a friction facing 6 is affixed to the inner face of a brake drum 7, the outer face of which is formed with a plurality of heat radiating fins 8 for the purpose of cooling the exposed face of the brake drum. An expanding brake member 9 is provided inside the flange of the drum to coact with the friction facing carried thereby.

While these showings are of automobile brakes, it is to be understood that the use of my invention is not confined to brakes for this purpose. The invention has been found to be particularly adaptable to hoists employing a cable drum, especially those hoists which are used in oil well drilling operations, wherein a cable with drilling tools must be slowly lowered through long distances, and continuous braking effected for long periods of time.

In hoist brakes, the friction lining often wears or burns out rapidly for the reason that the brakes are constantly applied and the heat generated cannot be quickly dissipated. Heat development may be continuous over a long period of time and the metal of a double faced brake may become dangerously hot. It must be remembered that, as stated, as the temperature of the asbestos rises, its conductivity for heat increases. The temperatures of the friction face of the asbestos may rise to a point where it becomes a conductor of heat rather than an insulator and quickly transmits the heat generated to the metal of the drum. By providing a naked face on the drum, or one which is roughened or undulatory for dissipation of heat, the drum acts to keep the base of the asbestos face cool and prevents this rise of heat conductivity.

In such brakes in the present invention there may be, as shown in Fig. 4, a cable drum 10 with a flange 11 which comprises the brake drum, and which is faced with a friction material 12 of the kind above described. The under or exposed face 13 of the flange is formed with annular corrugations as shown, or it may be formed with transverse corrugations 14 as shown in Fig. 5, and thereby capable of quickly dissipating heat generated by protracted application of the brake shoe because of its increased radiating surface. A metal band 14 surrounds the friction facing of the brake drum, and is contracted to engage it and thereby stop rotation when the brake is applied.

The advantage to be gained by coating, roughening, or increasing the surface area of that face of a brake drum which radiates the heat generated varies according to the character of the brake and the mount of work which it must perform in stopping rotation. For heavy duty it is preferable, though not necessary, that the heat radiating surface of the brake drum be roughened or corrugated to increase its surface area, or blackened to promote its heat radiating properties, whereas for light duty brakes even a plain polished surface may dissipate the heat sufficiently effectively.

Asbestos is ordinarily employed in forming friction facings under the present invention because of its mineral nature, low heat conductivity at ordinary braking temperatures, and incombustibility. Flexibility not being necessary, any other non-inflammable or incombustible composition, such as various cements and plastics capable of giving a rock-hard layer of low heat conductivity, may be used in lieu of asbestos. Metal reinforcement may be used liberally provided the use is not in such a way as to make the friction facing unduly conductive for heat.

What I claim is:—

1. A brake comprising coacting braking and braked elements and means for engaging said elements, a heat resisting mineral material of low heat conductivity affixed to one face of said braked element and presented to said braking element, the other face of said braked element being adapted to permit heat radiation.

2. In combination with braking and braked elements, a mineral facing of low heat conductivity affixed to one face of said braked element which is presented to the braking element, the other face being naked.

3. In combination with braking and braked elements, a flange on said braked element, a mineral facing of low heat conductivity affixed to one surface of said flange for coaction with said braking element, the opposite surface of said flange being adapted for heat radiation.

4. In combination with a brake drum having an annular flange, a mineral facing of low heat conductivity affixed to the outer face of said flange, a contacting braking element coacting with said mineral facing, the inner face of said flange being adapted for heat radiation.

5. A brake comprising coacting, braking, and braked elements, means for causing braking engagement of said elements, a heat resisting mineral material of low heat conductivity affixed to one face of the braked element and heat dissipating means associated with the other face of said element.

6. A brake comprising coacting, braking, and braked elements, means for causing braking engagement of said elements, a heat resisting mineral material of low heat conductivity affixed to one face of the braked element and fins on the other face of said element.

7. A brake comprising coacting, braking, and braked elements, means for causing braking engagement of said elements, a heat resisting mineral material of low heat conductivity affixed to one face of the braked element and the other face provided with a rough heat radiating surface.

8. A brake drum provided with attached asbestos resistance material on one surface only.

In testimony whereof, I have hereunto affixed my signature.

WILLIAM T. BONNER.